No. 836,409. PATENTED NOV. 20, 1906.
A. P. & C. E. SPITZER.
FLOUR REEL ATTACHMENT.
APPLICATION FILED APR. 11, 1906.
3 SHEETS—SHEET 3.
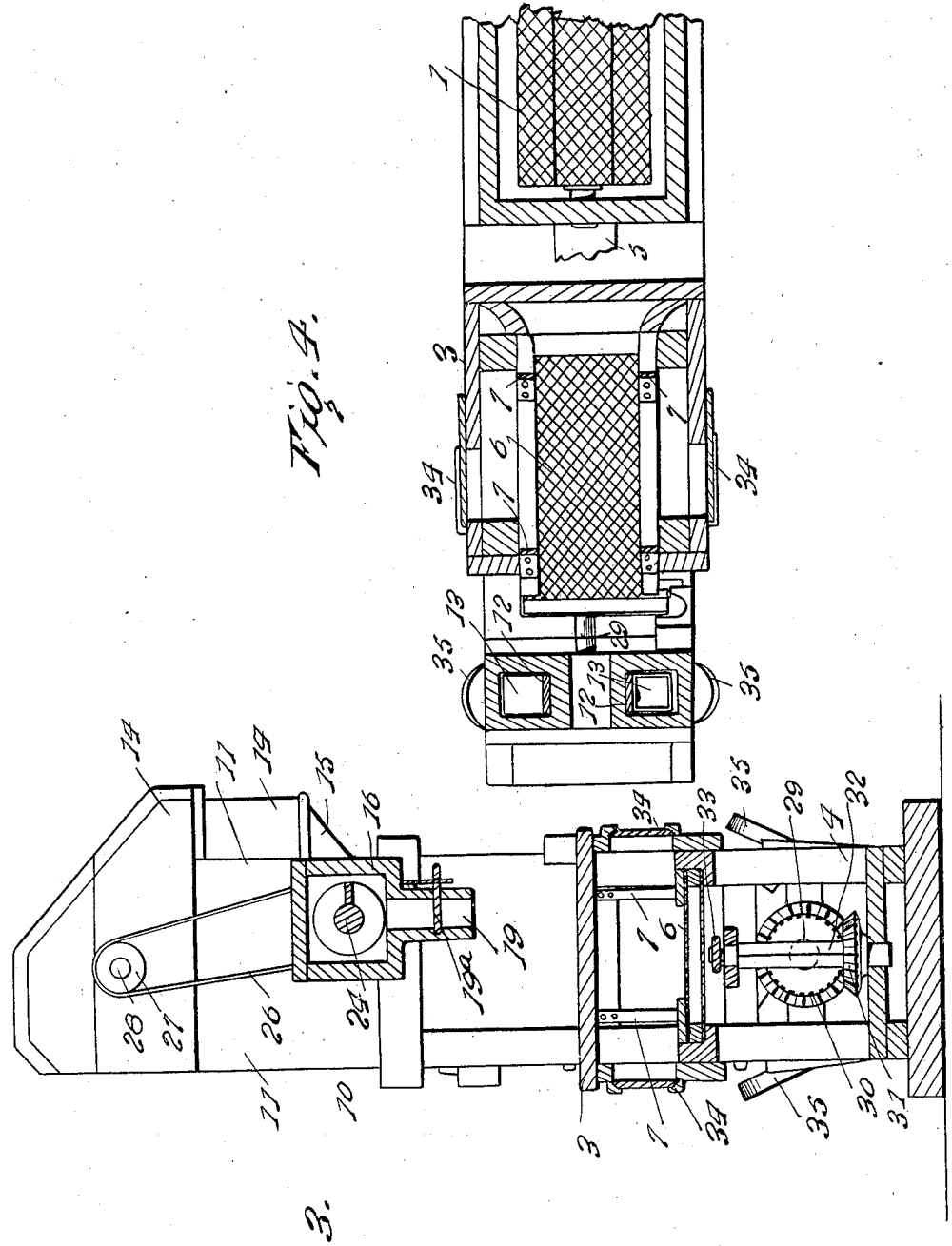

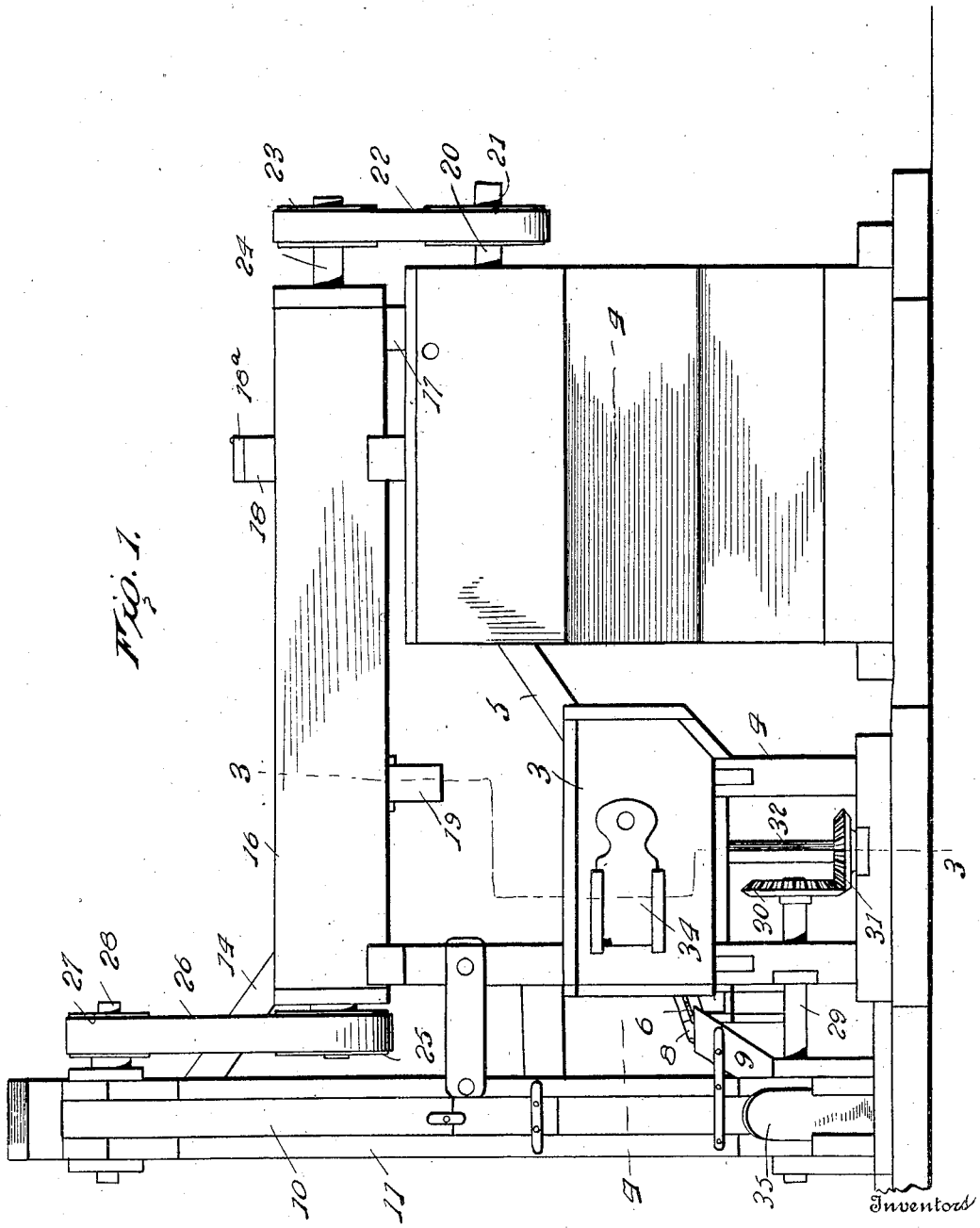

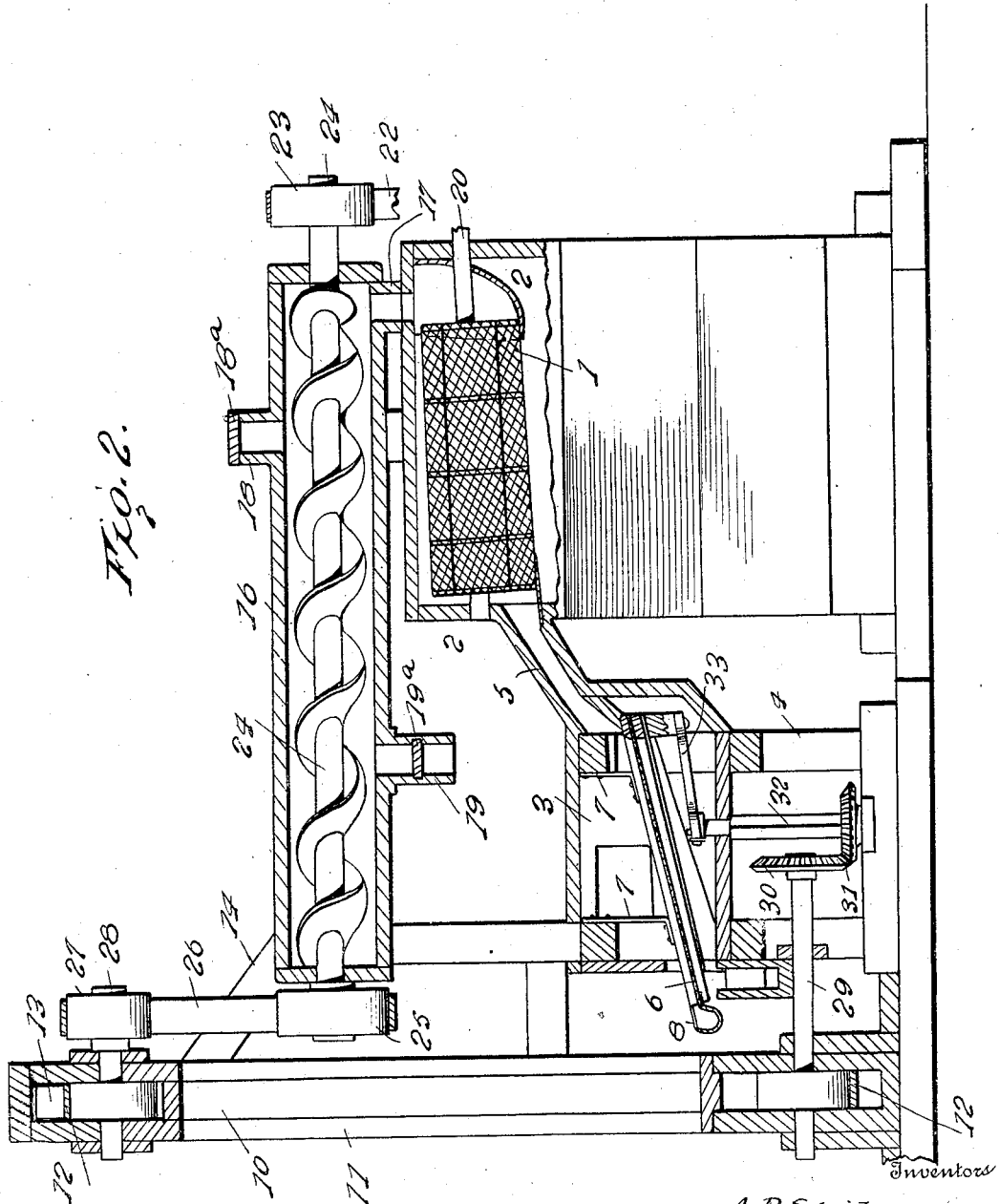

UNITED STATES PATENT OFFICE.

ANDERSON P. SPITZER AND CHARLES E. SPITZER, OF BROADWAY, VIRGINIA.

FLOUR-REEL ATTACHMENT.

No. 836,409.  Specification of Letters Patent.  Patented Nov. 20, 1906.

Application filed April 11, 1906. Serial No. 311,143.

*To all whom it may concern:*

Be it known that we, ANDERSON P. SPITZER and CHARLES E. SPITZER, citizens of the United States, residing at Broadway, in the county of Rockingham and State of Virginia, have invented certain new and useful Improvements in Flour-Reel Attachments, of which the following is a specification.

Our invention contemplates certain new and useful improvements in the milling of flour, and particularly refers to the dressing or grading process.

The object of our invention is to provide an improved attachment for a flour bolter or reel so arranged that wheat or corn or beans may be fed in with the stock at the head of the reel, passed therefrom onto a shaking screen, where the shorts will be separated from the beans and wheat or whatever is chosen to be used, and said beans or wheat carried to an elevated position by means of an elevator and returned by means of a conveyer back again in the head of the reel, so that the beans or wheat will be continuously fed into the reel. The purpose of feeding this grain into the reel is to prevent the bolting-cloth from becoming clogged in its meshes by the flour that is intended to pass therethrough, and the beans or whatever is used to beat the cloth will be by the action of the reel itself tumbled about inside of the reel and beat the cloth, so as to keep its meshes clear.

For a full description of the invention and the merits thereof and also to acquire a knowledge of the details of construction of the means for effecting the result reference is to be had to the following description and accompanying drawings, in which—

Figure 1 is a side elevation of our improved flour-reel attachment. Fig. 2 is a side elevation with parts broken away or in section. Fig. 3 is a vertical transverse section on the line 3 3 of Fig. 1. Fig. 4 is a horizontal section taken approximately on the line 4 4 of Fig. 1.

Corresponding and like parts are referred to in the following description and indicated in all the views of the drawings by the same reference characters.

Referring to the drawings, the numeral 1 designates a flour-reel provided with an intake-hopper 2 for the stock. Alongside of the casing of the reel is arranged a screen-boxing 3, mounted, preferably, on elevated supports or legs 4 and having a closed top provided with an inlet-opening connected to an outlet-opening of the reel by means of an inclined spout 5. Within the boxing 3 is mounted an inclined screen 6, which is constituted by a frame suspended from hamgers 7 in position to be shaken. One end of said screen 6 projects outside of the boxing 3 and is provided with a laterally-extending discharge-spout 8, extending above and leading into an inclined chute 9 at the bottom of an elevator 10. The elevator 10 is in the present instance composed of two upright casings 11, within which runs a belt 12, carrying a series of buckets 13, and the parts are so arranged that the buckets in their upward travel will pass over the outlet end of the chute 9. At the upper end of the elevator 10 is located another discharge-spout 14, leading downwardly therefrom in position to receive the contents of the successive buckets as they pass its upper end, and said spout 14 is connected, by means of a similar auxiliary spout 15, to one end of a horizontally-extending conveyer 16. The conveyer 16 extends from the elevator 11 back to the head of the reel 1 and is provided with a discharge-spout 17, leading into the head of the reel, in the present instance such spout being arranged to discharged into the hopper 2. The conveyer-casing is provided with two spouts. One spout (designated 18) is located on its upper side and is provided with a hinged or other cover 18$^a$, and the other spout 19 depends from the lower side of the conveyer-casing, preferably above the screen-boxing 3, and is provided with a slide-valve or other from of cut-off 19$^a$.

20 designates the main reel-shaft connected by a pulley 21 and belt 22 to a similar pulley 23 on the adjacent end of the conveyer-shaft 24. The other end of the conveyer-shaft 24 carries a pulley 25, connected by belt 26 to a pulley 27 on the uppermost elevator-shaft 28. The lower elevator-shaft 29 extends through and underneath the screen-box 3 and is provided with a miter gear-wheel 30, meshing with a pinion 31 on a vertical counter-shaft 32. The upper end of said shaft has an eccentric connection to a pitman 33, connected to one end of the screen 6.

The screen-box 3 is preferably provided in its sides with sliding doors 34, and the elevator-casing is also provided at its bottom with slides 35. By removing the slides 35 the lower end of the elevator may be cleaned whenever desired, and by means of the slide 25 and the door 34 access may be had to the interior of the lower end of the elevator-casing and the interior of the screen-box for any desired purpose.

In the practical operation of our improved flour-reel attachment beans or wheat or whatever is intended to be used to keep the bolting-cloth clear is fed in with the stock through the hopper 2 to the head of the reel and on the inside of the cloth. As the shaft 20 is turned to actuate the reel by any suitable power the beans or whatever grain is used will beat the cloth and keep the meshes clear. The said cleaning material will then be fed through the spout 5 onto the screen 6, which will separate the shorts from it, and said material will then be fed, by means of the spout 8 and shaft 9, into the lower end of the elevator 10 and then will be carried upwardly, by means of the series of buckets 13, and discharged through the spout 14 and the auxiliary spout 15 into the conveyer 16, from whence it will be fed back to the head of the reel and the continuous operation established.

The spout 18 may be used whenever it is desired to add to the material, being used to keep the reel-cloth clean or its meshes clear, and the other spout 19 of the conveyer may be used whenever there is too much material used and it is desired to draw some off.

From the foregoing description, in connection with the accompanying drawings, it will be seen that we have provided an improved means for keeping the reel-cloth clean at all times, so that its meshes will not be clogged up by the use of the continuous flow of beans or wheat or other material into the head of the reel, where the grains will act as beaters, and which at the same time in this continuous operation includes a step by which shorts are separted from the beating material before it is passed back again into the head of the reel.

Having thus described the invention, what is claimed as new is—

In mechanism of the class described, the combination of an inclined reel, a shaft rotatably supporting said reel, a supply-spout leading into one end of the reel, a discharge at the opposite end of the reel, a vibrating screen arranged to receive material from the discharge of the reel and having a discharge trough or spout at one end thereof, an elevator extending upwardly from the discharge-spout of the vibrating screen, a conveyer extending from the upper portion of the elevator to the supply-spout of the reel, a chute establishing communication between the upper end of the elevator and the conveyer aforesaid, said conveyer embodying a shaft, a drive-shaft at the upper end of the elevator, a belt connection between the drive-shaft aforesaid and the shaft of the conveyer, another drive-shaft at the lower end of the elevator, a shaft arranged beneath the vibrating screen and connected by a gear-train with the drive-shaft at the lower end of the elevator, an eccentric and pitman connection between the shaft below the vibrating screen and said screen, a belt connection between the shaft of the conveyer and the shaft of the reel, and supply and discharge spouts in the length of the conveyer above mentioned for replenishing or decreasing the supply of material which is fed by said conveyer back to the reel.

In testimony whereof we affix our signatures in presence of two witnesses.

ANDERSON P. SPITZER. [L. S.]
  CHARLES E. SPITZER. [L. S.]

Witnesses:
 S. W. BREWER,
 R. S. CLARK.